(12) United States Patent
Tomasini et al.

(10) Patent No.: US 6,842,520 B2
(45) Date of Patent: Jan. 11, 2005

(54) TELEPHONE

(75) Inventors: Luciano Tomasini, Milan (IT); Giancarlo Clerici, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 492 days.

(21) Appl. No.: 09/790,479

(22) Filed: Feb. 21, 2001

(65) Prior Publication Data
US 2001/0038692 A1 Nov. 8, 2001

(30) Foreign Application Priority Data
Feb. 22, 2000 (EP) .............................. 00830123

(51) Int. Cl.⁷ .......................... H04M 1/00; H04M 9/00; H04M 9/08
(52) U.S. Cl. .............. 379/413; 379/413.01; 379/395.01
(58) Field of Search ............................ 379/413, 399.01, 379/395.01, 388.01

(56) References Cited
U.S. PATENT DOCUMENTS 3,969,591 A 7/1976 Sekiguchi et al. ........ 179/84 R
4,488,006 A * 12/1984 Essig et al. ............ 379/395.01
4,975,949 A 12/1990 Wimsatt et al. ............. 379/387

FOREIGN PATENT DOCUMENTS

JP 63 266956 11/1988

* cited by examiner

Primary Examiner—Curtis Kuntz
Assistant Examiner—Alexander Jamal
(74) Attorney, Agent, or Firm—Lisa K. Jorgenson; Robert Iannucci; Seed IP Law Group PLLC

(57) ABSTRACT

A telephone comprises an acoustic alarm, conversation members, first control means for the acoustic alarm, second control means for the conversation members, first supply means and second supply means for absorbing energy from a telephone line, the first supply means and the second supply means supplying the first control means in a call condition and the second control means in a conversation condition, respectively, wherein the first supply means further supplying the second control means in the call condition.

10 Claims, 3 Drawing Sheets

TELEPHONE

TECHNICAL FIELD

The present invention relates to a telephone.

BACKGROUND OF THE INVENTION

A telephone is generally connected, by means of a telephone line, to an exchange which supplies the energy necessary to operate the telephone. In particular, the exchange constantly transmits a direct-current supply voltage on the telephone line. During a conversation, the direct-current voltage operates the various conversation members of the telephone such as, for example, a microphone and a loudspeaker, which are housed in a handset. On the other hand, when the telephone receives an incoming call, the exchange also transmits a corresponding sinusoidal signal on the telephone line; this call signal operates a buzzer which informs a user of the incoming call.

In a known passive telephone, there is a double switch operated by a fork-shaped hook for the handset. When the handset is resting on the fork-shaped hook, the switch connects the buzzer to the telephone line (in series with a decoupling capacitor); when the handset is lifted, the switch connects the conversation members to the telephone line. The call signal transmitted by the exchange on the telephone line thus rings the buzzer directly until the user lifts the handset in order to answer the call.

In a known electronic telephone, on the other hand, the buzzer and the conversation members are controlled by respective control units. When the telephone receives an incoming call, the signal transmitted by the exchange on the telephone line is used by an alternating-current/direct-current (AC/DC) converter to supply the control unit of the buzzer. When the user lifts the handset in order to answer the call, a switch operated by the fork-shaped hook connects a direct-current/direct-current (DC/DC) converter to the telephone line; this DC/DC converter supplies the control unit of the conversation members (whilst the AC/DC converter is automatically deactivated).

Each time the user lifts the handset in order to answer a call and thus activates the DC/DC converter, the control unit of the conversation members is subject to an abrupt transient phenomenon before reaching a steady operating state. During the transient phenomenon, electrical interference with components having frequencies within the acoustic band is produced and turns into annoying noises in the loudspeaker of the telephone.

In order to solve this problem, it has been proposed to use filters which reduce the effect of the electrical interference. These filters require the use of fairly bulky, discrete components which have to be disposed outside an integrated circuit in which the control unit of the conversation members is typically formed.

A further problem is that it is necessary to keep the duration of the transient phenomenon within a narrow limit to prevent annoying waiting times for the user. A known solution is to provide speed-up circuits for activating the DC/DC converter, which reduce the duration of the transient phenomenon. However, these speed-up circuits are quite complex and rather expensive.

With reference in particular to FIG. 1, this shows a fixed telephone 100 commonly used in private dwellings and in offices. The telephone 100 has a main body 105 made, for example, of plastics material. A handset 110 which houses a microphone and a loudspeaker is connected to the main body 105 by means of a flexible cable wound in a spiral. The handset 110 normally rests on a fork-shaped hook 115 which projects from a seat formed in the main body 105. The telephone 100 also has a keypad 120 which is used for dialing a telephone number to be called. Within the main body 105 there is a buzzer 125 which communicates with the exterior through a perforated portion. A connector 130 (connected to the main body by means of a flexible cable) is used to connect the telephone 100 to a telephone socket (not shown in the drawing).

In a known telephone, as shown in FIG. 2, the connector has two terminals 130a and 130b which are connected to a telephone line 205. The terminals 130a, 130b are connected to respective input terminals of a polarity conditioning circuit 210 typically formed by a bridge composed of diodes with low conduction thresholds or a bridge composed of MOS transistors; the polarity conditioning circuit 210 has a reference output terminal 215g and a supply output terminal 215v.

The telephone includes a supply constituted basically by an alternating-current/direct-current (AC/DC) converter which absorbs energy from the telephone line 205. The supply comprises an input section (AC/DC) 220 having a reference terminal connected to the terminal 215g and an input terminal connected to the terminal 215v. The AC/DC input section 220 has an output terminal connected to an anode terminal of a diode D1. A cathode terminal of the diode D1 is connected to a terminal of a capacitor C1 the other terminal of which is connected to the reference terminal 215g. A comparator block 225 receives as an input a signal which is present at the supply terminal 215v; the comparator block 225 outputs a call presence signal R_ON which is supplied to an enabling terminal of the AC/DC input section 220.

The supply 220, D1, C1 described above supplies a control unit (CTRL) 230 of the buzzer 125. The control unit 230 has a reference terminal and a supply terminal which are connected, respectively, to the terminal 215g and to the cathode terminal of the diode D1. The control unit 230 also receives, at its own enabling terminal, the call presence signal R_ON supplied by the comparator block 225. The control unit 230 has two output terminals which are connected to respective terminals of the buzzer 125.

The telephone has a further supply (which absorbs energy from the telephone line 205), constituted substantially by a direct-current/direct-current (DC/DC) converter. This supply includes an input section (DC/DC) 240 having a reference terminal connected to the terminal 215g and an input terminal connected to the terminal 215v by means of a switch 245 operated by the fork-shaped hook 115 on which the handset 110 rests. The DC/DC input section 240 has an output terminal connected to an anode terminal of a diode D2. A cathode terminal of the diode D2 is connected to a terminal of a capacitor C2 the other terminal of which is connected to the reference terminal 215g.

The further supply 240, D2, C2 described above supplies a control unit (CTRL) 250 for the microphone and the loudspeaker which are housed in the handset 110. The control unit 250 has a reference terminal and a supply terminal which are connected, respectively, to the terminal 215g and to the cathode terminal of the diode D2. The control unit 250 has two output terminals which are connected to respective terminals of the handset 110.

The telephone constantly receives a direct-current supply voltage from the telephone line 205. For example, a battery disposed in a telephone exchange supplies to the telephone line 205 a supply voltage equal to 48V; because of the voltage drop in the telephone line 205 (which has a length of up to a few km), a supply voltage of the order of 4–10V (of positive or negative value according to the way in which the terminals 130a, 13Gb are connected to the telephone line 205) is available at the terminals 130a, 130b. The polarity conditioning circuit 210 ensures that a voltage of positive value relative to the reference terminal 215g (substantially equal to the absolute value of the voltage at the terminals 130a, 130b minus the voltage drops in the diodes of the bridge) is always available at the supply terminal 215v.

In a rest condition, the call presence signal R_ON is deasserted so that the AC/DC input section 220 is deactivated. At the same time, the handset 110 is resting on the fork-shaped hook 115 and the switch 245 is therefore open.

When the telephone receives an incoming call, the exchange transmits on the telephone line 205 a sinusoidal call signal having, for example, a peak to peak amplitude of 250 V and a frequency of 100 Hz. The comparator block 225 detects the presence of the call signal and asserts the call presence signal R_ON. The AC/DC input section 220 is consequently activated and charges the capacitor C1 to an internal supply voltage, for example, equal to 2.5–3V (the diode D1 ensures that the capacitor C1 cannot be discharged to the AC/DC input section 220). The voltage at the terminals of the capacitor C1 supplies the control unit 230 (providing a relatively high power). The control unit 230 is activated by the call presence signal R_ON and therefore causes the buzzer 125 to ring.

As soon as a user lifts the handset 110 in order to answer the call, the fork-shaped hook 115 causes the switch 245 to close. The exchange notices a change in current absorption on the telephone line 205 by the telephone and therefore interrupts the call signal and establishes a connection with a calling telephone. The call presence signal R_ON is consequently deasserted so that the AC/DC input section 220 is deactivated. The DC/DC input section 240 charges the capacitor C2 to the internal supply voltage (the diode D2 ensures that the capacitor C2 cannot be discharged to the DC/DC input section 240). This voltage at the terminals of the capacitor C2 supplies the control unit 250 (supplying a fairly low power). This enables a conversation to be activated by the transmission, on the telephone line 205, of a signal representative of voice data and having a limited peak to peak amplitude (for example of a few V) and a frequency within the acoustic band (200–3,400 Hz).

In some known telephones, the control unit 230 and the buzzer 125 are also used during conversation, for example, with a hands-free function. In this case, the DC/DC input section 240 also supplies the control unit 230 by means of a further diode and a further capacitor (not shown in the drawing).

Each time the DC/DC input section 240 is activated, the charging time of the capacitor C2 gives rise to a transient phenomenon in the supply voltage of the control unit 250 with consequent electrical interference with components having frequencies within the acoustic band. To prevent this electrical interference from being translated into annoying noises in the loudspeaker housed in the handset 110 and to reduce the duration of the transient phenomenon, the telephone is provided, respectively, with filters and with speed-up circuits for charging the capacitor C2 (not shown in the drawing).

SUMMARY OF THE INVENTION

An embodiment of the invention provides a telephone comprising an acoustic alarm, conversation members, first control means for the acoustic alarm, second control means for the conversation members, first supply means and second supply means for absorbing energy from a telephone line, the first supply means and second supply means supplying the first control means in a call condition and the second control means in a conversation condition, respectively, wherein the first supply means further supply the second control means in the call condition.

Moreover, the present invention also proposes a corresponding method of operating the telephone.

BRIEF DESCRIPTION OF THE DRAWINGS

Further characteristics and the advantages of the telephone according to the present invention will become clear from the following description of a preferred embodiment thereof, given by way of non-limiting example, with reference to the appended drawings, in which.

DETAILED DESCRIPTION OF THE INVENTION

Figure 1:
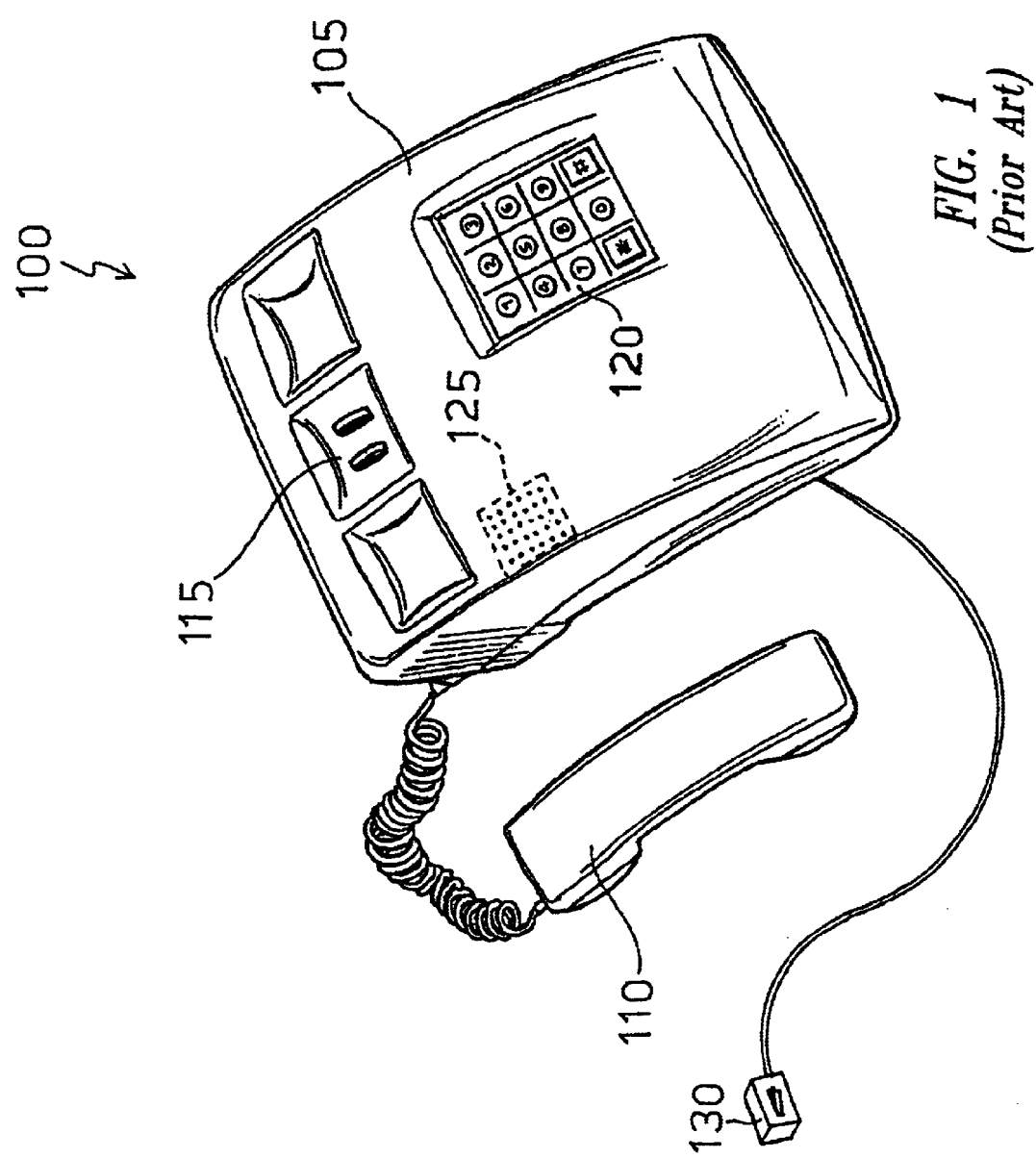
FIG. 1 shows a telephone.
Figure 2:
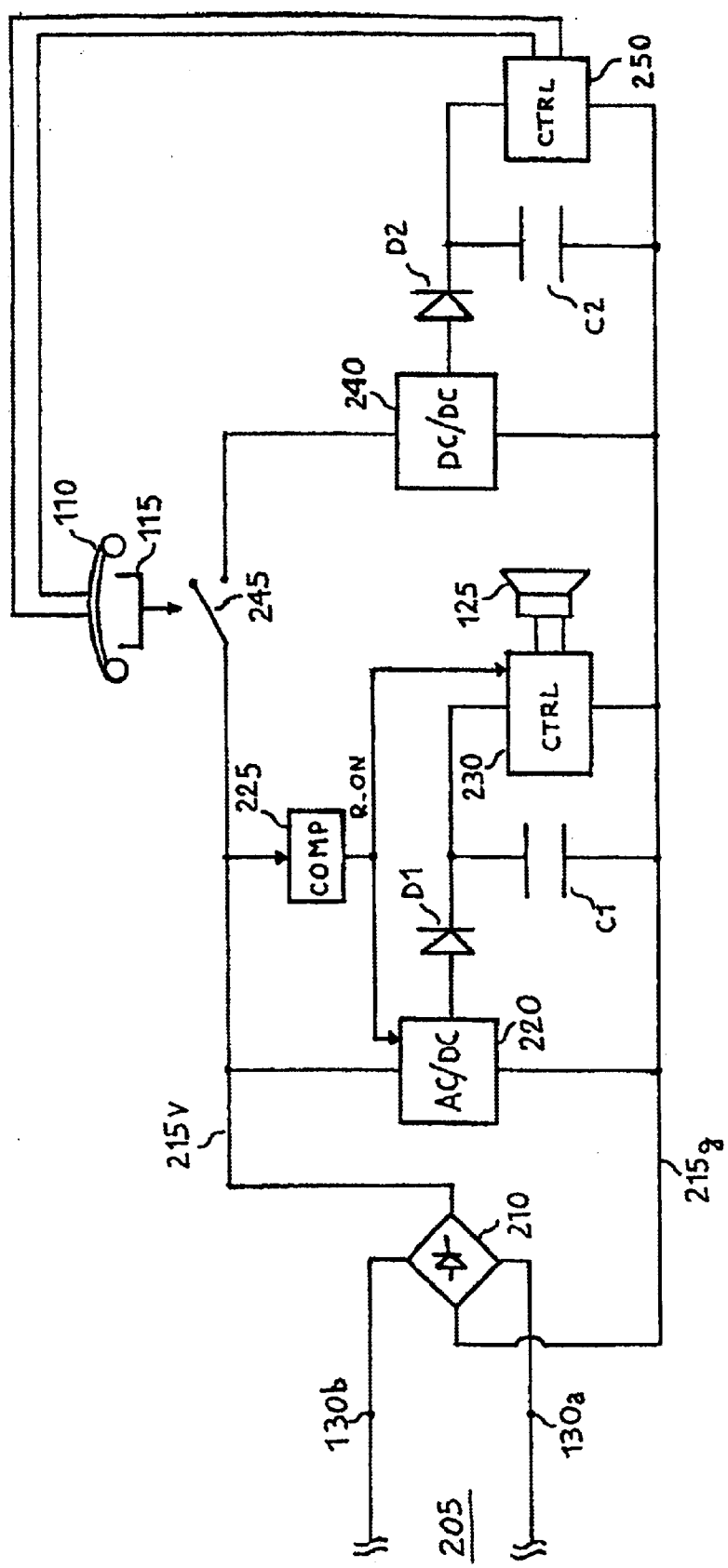
FIG. 2 is a basic block diagram of a known telephone.
Figure 3:
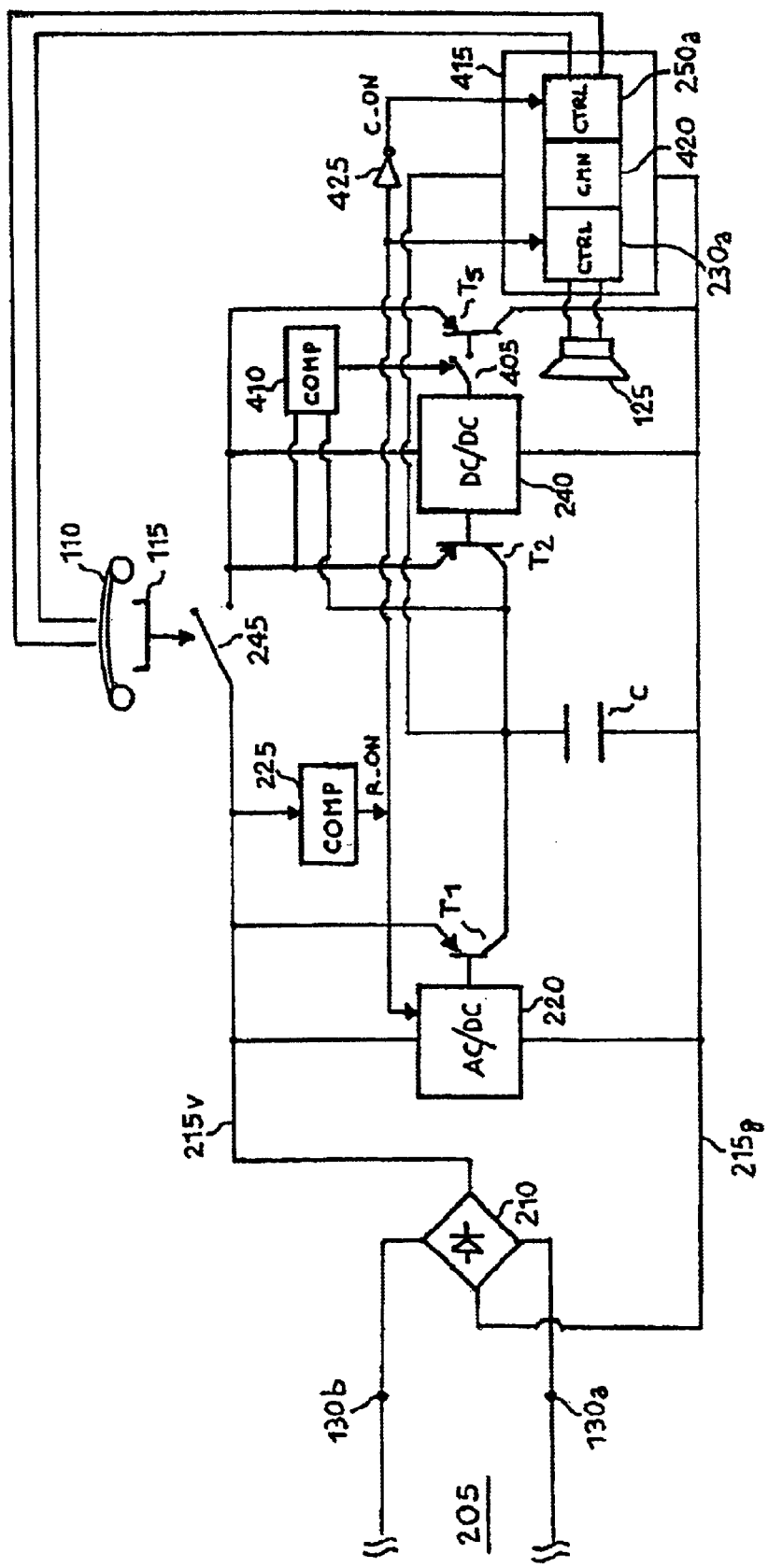
FIG. 3 is a basic block diagram of a telephone according to the present invention.

With reference now to FIG. 3, this is a basic block diagram of a preferred embodiment of the present invention (elements corresponding to those shown in the previous drawing are identified by the same reference numerals and an explanation thereof is omitted to simplify the description).

In this telephone, the diodes connected to the output terminal of the AC/DC input section 220 and to the output terminal of the DC/DC input section 240 are replaced by respective transistors. In particular, there is a pnp bipolar transistor T1 having an emitter terminal and a base terminal connected, respectively, to the input terminal and to the output terminal of the AC/DC input section 220; the transistor T1 also has a collector terminal connected to a terminal of a capacitor C, the other terminal of which is connected to the reference terminal 215g. Similarly, a pnp bipolar transistor T2 has an emitter terminal connected to the input terminal of the DC/DC input section 240, a base terminal connected to the output terminal of the DC/DC input section 240, and a collector terminal connected to the collector terminal of the transistor T1 (and therefore also to the capacitor C).

The telephone includes a further pnp bipolar transistor Ts associated with the DC/DC input section 240. The transistor Ts has an emitter terminal connected to the input terminal of the DC/DC input section 240, a base terminal connected, by means of an electronic switch 405, to a further output terminal of the DC/DC input section 240, and a collector terminal connected to the reference terminal 215g. A comparator block 410 has two input terminals connected, respectively, to the emitter terminal and to the collector terminal of the transistor T2; the comparator block outputs a signal for controlling the electronic switch 405.

The control unit for the buzzer 125 and the control unit for the microphone and the loudspeaker housed in the handset 110 are formed in a single control device 415 integrated in a chip of semiconductor material. The control device 415 has a reference terminal connected to the terminal 215g and a supply terminal connected to the collectors of the transistors T1 and T2 (and hence to the capacitor C).

The control device 415 includes a block (CMN) 420 constituted by circuit elements common to both of the control units such as, for example, a biasing circuit. The common block 420 is connected to a control block (CTRL) 230a and a control block (CTRL) 250a corresponding, respectively, to the control unit for the buzzer 125 and to the control unit for the microphone and the loudspeaker housed in the handset 110 (apart from the common circuit elements of the block 420). The control block 230a and the control block 250a each have two output terminals which are connected, respectively, to the corresponding terminals of the buzzer 125 and of the handset 110.

The control block 230a also receives, at its own enabling terminal, the call presence signal R_ON supplied by the comparator block 225. The call presence signal R_ON is also supplied as an input to a NOT logic gate 425 which outputs a conversation presence signal C_ON; the conversation presence signal C_ON is supplied to an enabling terminal of the control block 250a.

When the telephone receives an incoming call, the comparator block 225 asserts the call presence signal R_ON. The AC/DC input section 220 is consequently activated and makes the transistor T1 conductive so as to charge the capacitor C to the internal supply voltage (2.5–3V). The voltage at the terminals of the capacitor C supplies the control device 415. The common block 420 is always active and the control block 230a is activated by the call presence signal R_ON so as to cause the buzzer 125 to ring; the conversation presence signal C_ON, on the other hand, is deasserted so that the control block 250a is deactivated.

As soon as the user lifts the handset 110 in order to answer the call, the fork-shaped hook 115 causes the switch 245 to close and the exchange therefore interrupts the call signal and establishes the connection with the calling telephone. The call presence signal R_ON is therefore deasserted so that the AC/DC input section is deactivated. At the same time, the DC/DC input section 240 makes the transistor T2 conductive so that the capacitor C which supplies the control device 415 is kept charged. The control block 230a is deactivated by the call presence signal R_ON. The conversation presence signal C_ON, on the other hand, is asserted and activates the control block 250a (whilst the common block 420 always remains active) so as to permit conversation.

The electronic switch 405 is normally open so that the transistor Ts is not conductive. If the voltage between the emitter terminal and the collector terminal of the transistor T2 falls below a threshold value (for example, of between 0.2 and 0.4V), such as to bring the transistor T2 towards the non-conductive state, the comparator block 410 closes the electronic switch 405. The transistor Ts is thus made conductive and shunts towards the reference terminal 215g the current which was passing through the transistor T2 and the capacitor C. This achieves a constant current absorption on the telephone line by the transistors T2 and Ts, preventing the temporary non-conduction of the transistor T2 from causing a variation in the current on the telephone line 205 which would be interpreted by the exchange as an acoustic signal.

In the telephone described above, when the user lifts the handset 110, activating the DC/DC input section 240, the capacitor C is already charged to the internal supply voltage (since it has been charged previously by the AC/DC input section 220 and by the transistor T1). The microphone and the loudspeaker housed in the handset 110 can thus be activated immediately.

This solution prevents transient phenomena and consequent electrical interference from arising. This avoids both the use of filters dedicated to reducing electrical interference and the use of speed-up circuits for reducing the duration of the transient phenomenon. The telephone is consequently simpler and more compact.

Similar considerations apply if the telephone has a different structure, for example, if it is of the cordless type (with a fixed base connected to the telephone line) or if it includes other units (such as, for example, a hands-free device, a telephone number memory), if different supply voltages or call signals are used, if the buzzer is replaced by another acoustic alarm or another call indicator device such as a light or other visual indicator, if different conversation members are provided (in addition to or instead of the microphone and the loudspeaker housed in the handset), if the supplies and the control device are replaced by other equivalent means, etc. More generally, in the telephone of an embodiment of the present invention, there are first and second supply means which supply, respectively, the control means for the acoustic alarm in a call condition and the control means for the conversation members in a conversation condition; the first supply means further supply the control means of the conversation members in the call condition.

In the particular embodiment of the present invention described above, the control block 250a (associated with the microphone and the loudspeaker housed in the handset 110) is deactivated in the call condition. This reduces the power consumption of the control device 415 in this condition to the minimum, thus making as much power as possible available for controlling the buzzer 125.

Moreover, the fact that the control blocks 230a, 250a and the common block 420 are formed in a single control device 415 considerably simplifies the structure of the telephone. This also avoids duplication of the circuit elements of the common block 420, making the control device 415 extremely compact.

The particular embodiment of the supply circuits described above is simple and effective. Moreover, the transistors T1 and T2 have a lower voltage drop than the diodes used in known telephones; this increases the voltage and hence the power, which is available at the terminals of the capacitor C for controlling the buzzer 125 in the call condition. This embodiment is particularly advantageous for telephone lines which are very long and therefore have a large voltage drop.

Similar considerations apply if the control block associated with the buzzer is not deactivated in the conversation condition (for example, in order to be used for the hands-free function), if the control device has a different structure, if the supply circuits are of a different type, for example, with MOSFET transistors, if the electronic switch 405 is replaced by other equivalent means for detecting a state of the transistor T2 and activating the transistor Ts in dependence on the state detected, etc.

The telephone of the present invention may, however, also be formed without deactivation of the control block associated with the microphone and with the loudspeaker housed in the handset in the call condition, with the provision of two separate control units (both connected to the capacitor C) and with the common circuit elements duplicated (with the possibility of deactivating the entire control unit of the conversation members in the call condition), with supply circuits which use diodes (and not transistors), etc.

Naturally, in order to satisfy contingent and specific requirements, an expert in the art may apply to the above-described telephone many modifications and variations all of which, however, are included within the scope of protection of the invention, as defined by the following claims.

We claim:

1. A telephone comprising:
   an acoustic alarm;
   conversation members;
   first control means for the acoustic alarm;
   second control means for the conversation members; and
   first supply means and second supply means for absorbing energy from a telephone line, the first supply means and the second supply means supplying the first control means in a call condition and the second control means in a conversation condition, respectively, wherein:
   the first supply means further supply the second control means in the call condition; and
   the first supply means and the second supply means include a capacitor in common, for supplying the first control means in the call condition and for supplying the second control means in the conversation condition, the capacitor being connected to the first control means and to the second control means, wherein the first control means and the second control means are formed in a single control device, the control device having a reference terminal and a supply terminal, the capacitor having a first terminal and a second terminal connected, respectively, to the reference terminal and to the supply terminal of the control device, and in which the first supply means include a first input section and a first transistor and the second supply means include a second input section and a second transistor, each input section having a reference terminal, an input terminal, and an output terminal, the reference terminal and the output terminal of the input section being connectable to a telephone line, and each transistor having a first power terminal connected to the supply terminal of the corresponding input section, a control terminal connected to the output terminal of the corresponding input section, and a second power terminal connected to the second terminal of the capacitor, and wherein the second supply means comprise a further transistor having a first power terminal, a control terminal and a second power terminal, connected, respectively, to the supply terminal, to a further output terminal, and to the reference terminal of the second input section, and means for detecting a state of the second transistor and for activating the further transistor in dependence on the state detected.

2. A telephone according to claim 1, further comprising means for deactivating at least a portion of the second control means in the call condition.

3. A telephone according to claim 2, in which the first supply means and the second supply means supply the control device in the call condition and in the conversation condition, respectively.

4. A telephone according to claim 3, in which the control device includes circuit elements common to the first control means and to the second control means, the common circuit elements being active both in the call condition and in the conversation condition.

5. A telephone according to claim 1, in which the detection means activate the further transistor when a potential difference between the first and second power terminals of the second transistor falls below a threshold value.

6. A telephone, comprising:
   a telephone supply line for connection to a telephone line;
   a call indicator device;
   a conversation member for enabling a user to converse via the telephone line;
   a first controller coupled to, and structured to activate, the call indicator device in a call condition;
   a second controller coupled to, and structured to activate, the conversation members in a conversation condition;
   a call detector coupled to the telephone supply line and structured to detect a call signal on the telephone supply line and produce an activation signal in response;
   a first switch coupled between the telephone supply line and a supply node coupled to the first and second controllers, the first switch having a control terminal coupled to the call detector such that the first switch is activated by the activation signal and supplies power from the telephone supply line to the supply node;
   a capacitive element coupled between the supply node and a voltage reference for supplying the first controller in the call condition and for supplying the second controller in the conversation condition;
   a second switch for activation by a user when the user desires to make or receive a telephone call;
   a third switch having a first conduction terminal coupled to the supply node and a second conduction terminal coupled by the second switch to the telephone supply line;
   a detector having an input coupled to the third switch and an output, the detector being structured to detect when a voltage across the third switch drops below a threshold; and
   a fourth switch having a first conduction terminal coupled to the second switch, a second conduction terminal coupled to a voltage reference, and a control terminal coupled to the detector such that the fourth switch is activated in response to the detector detecting when the voltage across the third switch drops below the threshold.

7. The telephone of claim 6, further comprising an AC/DC converter having a supply terminal coupled to the telephone supply line, a control terminal coupled to the call detector, and an output terminal coupled to the control terminal of the first switch, the AC/DC converter being structured to activate the first switch in response to receiving the activation signal from the call detector.

8. The telephone of claim 6, further comprising a DC/DC converter having a supply terminal coupled by the second switch to the telephone supply line and an output terminal coupled to a control terminal of the third switch, the DC/DC converter being structured to activate the third switch in response to the second switch being activated to electrically connect the DC/DC converter to the telephone supply line.

9. The telephone of claim 6 wherein the first and second controllers are integrated together in a chip of semiconductor material.

10. A telephone, comprising:
    a telephone supply line for connection to a telephone line;
    a call indicator device;
    a conversation member for enabling a user to converse via the telephone line;
    a first controller coupled to, and structured to activate, the call indicator device;
    a second controller coupled to, and structured to activate, the conversation members;
    a call detector coupled to the telephone supply line and structured to detect a call signal on the telephone supply line and produce an activation signal in response;

a first switch coupled between the telephone supply line and a supply node coupled to the first and second controllers, the first switch having a control terminal coupled to the call detector such that the first switch is activated by the activation signal and supplies power from the telephone supply line to the supply node;

a second switch for activation by a user when the user desires to make or receive a telephone call;

a third switch having a first conduction terminal coupled to the supply node and a second conduction terminal coupled by the second switch to the telephone supply line;

a detector having an input coupled to the third switch and an output, the detector being structured to detect when a voltage across the third switch drops below a threshold; and a fourth switch having a first conduction terminal coupled to the second switch, a second conduction terminal coupled to a voltage reference, and a control terminal coupled to the detector such that the fourth switch is activated in response to the detector detecting when the voltage across the third switch drops below the threshold.

* * * * *